(12) United States Patent
Guymon et al.

(10) Patent No.: US 12,172,318 B2
(45) Date of Patent: Dec. 24, 2024

(54) ROBOT WITH SMART TRAJECTORY RECORDING

(71) Applicant: Lincoln Global, Inc., Santa Fe Springs, CA (US)

(72) Inventors: Lance F. Guymon, Fort Collins, CO (US); Daniel J. Spieker, Windsor, CO (US); Jacob F. Aas, Fort Collins, CO (US); Levi J. Mitchell, Windsor, CO (US); Zachary J. Bennett, Fort Collins, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 322 days.

(21) Appl. No.: 17/880,802

(22) Filed: Aug. 4, 2022

(65) Prior Publication Data

US 2023/0150131 A1 May 18, 2023

Related U.S. Application Data

(60) Provisional application No. 63/280,289, filed on Nov. 17, 2021.

(51) Int. Cl.
*B25J 9/16* (2006.01)
*B25J 11/00* (2006.01)

(52) U.S. Cl.
CPC ............ *B25J 9/1666* (2013.01); *B25J 9/163* (2013.01); *B25J 9/1653* (2013.01); *B25J 9/1679* (2013.01); *B25J 11/005* (2013.01)

(58) Field of Classification Search
CPC ........ B25J 9/1666; B25J 9/163; B25J 9/1653; B25J 9/1679; B25J 11/005; B25J 9/1664; G05B 2219/40384
See application file for complete search history.

(56) References Cited

U.S. PATENT DOCUMENTS

| | | |
|---|---|---|
| 4,224,501 A | 9/1980 | Lindbom et al. |
| 4,380,696 A | 4/1983 | Masaki |

(Continued)

FOREIGN PATENT DOCUMENTS

| | | |
|---|---|---|
| CN | 109318232 A | 2/2019 |
| CN | 209919892 U | 1/2020 |

(Continued)

OTHER PUBLICATIONS

Ni, et al.; "Haptic and Visual Augmented Reality Interface for Programming Welding Robots;" Advanced Manufacturing, vol. 5; Dated Aug. 18, 2017; pp. 191-198.

(Continued)

*Primary Examiner* — Bhavesh V Amin
(74) *Attorney, Agent, or Firm* — David J. Muzilla

(57) ABSTRACT

An embodiment includes a robotic welding system for generating a motion program, having a programmable robot controller of a robot having a computer processor and a computer memory. The programmable robot controller is configured to digitally record, in the computer memory, a plurality of spatial points along an operator path in a 3D space taken by a calibrated tool center point (TCP) of the robot as an operator manually moves a robot arm of the robot along the operator path from a start point to a destination point within the 3D space. The programmable robot controller is also configured to identify and eliminate extraneous spatial points from the plurality of spatial points as digitally recorded, leaving a subset of the plurality of spatial points as digitally recorded, where the extraneous spatial points are a result of extraneous movements of the robot arm by the operator.

20 Claims, 6 Drawing Sheets

(56) References Cited

U.S. PATENT DOCUMENTS

| | | | |
|---|---|---|---|
| 6,492,618 | B1 | 12/2002 | Flood et al. |
| 7,353,081 | B2 | 4/2008 | Skourup et al. |
| 8,386,080 | B2 | 2/2013 | Bosscher et al. |
| 8,680,434 | B2 | 3/2014 | Stöger et al. |
| 8,843,236 | B2 | 9/2014 | Barajas et al. |
| 8,996,167 | B2 | 3/2015 | Linder et al. |
| 9,056,396 | B1 | 6/2015 | Linnell |
| 9,110,466 | B2 | 8/2015 | Yanagawa et al. |
| 9,718,189 | B2 | 8/2017 | Atohira et al. |
| 9,833,857 | B2 | 12/2017 | Artelsmair |
| 9,844,622 | B2 | 12/2017 | Savage |
| 9,895,803 | B1 | 2/2018 | Oslund |
| 9,919,424 | B1 | 3/2018 | Devengenzo |
| 9,993,222 | B2 | 6/2018 | Azizian et al. |
| 10,131,012 | B2 | 11/2018 | Cenko |
| 10,596,700 | B2 | 3/2020 | Corkum et al. |
| 10,766,140 | B2 | 9/2020 | Krasny et al. |
| 11,067,965 | B2 | 7/2021 | Spieker et al. |
| 11,148,285 | B2 | 10/2021 | Mönnich |
| 11,407,111 | B2 | 8/2022 | Zhang et al. |
| 2015/0094855 | A1 | 4/2015 | Chemouny et al. |
| 2019/0086907 | A1 | 3/2019 | Oestergaard et al. |
| 2020/0139474 | A1 | 5/2020 | Mayer et al. |
| 2020/0198140 | A1 | 6/2020 | Dupuis et al. |
| 2021/0170515 | A1 | 6/2021 | Oh |
| 2022/0032461 | A1 | 2/2022 | Gupta et al. |
| 2023/0150131 | A1* | 5/2023 | Guymon ............... B25J 11/005 700/245 |
| 2023/0234230 | A1* | 7/2023 | Aas ..................... B25J 11/005 700/255 |

FOREIGN PATENT DOCUMENTS

| | | |
|---|---|---|
| JP | 2020-189304 A | 11/2020 |
| WO | 2011/039542 A1 | 4/2011 |
| WO | 2021/069433 A1 | 4/2021 |
| WO | 2022/119934 A1 | 6/2022 |
| WO | 2022/136865 A1 | 6/2022 |
| WO | 2023/038942 A2 | 3/2023 |

OTHER PUBLICATIONS

Ang, et al.; "A Walk-Through Programmed Robot for Welding in Shipyards;" Industrial Robot, vol. 26, No. 5; Dated Jul. 1999; pp. 377-388.

International Search Report from Corresponding Application No. PCT/US2022/049954; Dated Mar. 15, 2023; pp. 1-6.

Wang, et al.; "A Survey of Welding Robot Intelligent Path Optimization;" Journal of Manufacturing Processes; https://doi.org/10.1016/j.jmapro.2020.04.085; Dated Apr. 29, 2020; pp. 1-10.

Fang, et al.; "Robot Path Planning Optimization for Welding Complex Joints;" International Journal of Advanced Manufacturing Technology; https://sci-hub.se/https://doi.org/10.1007/s00170-016-9684-z; Published Nov. 15, 2016; pp. 1-11.

* cited by examiner

ROBOT WITH SMART TRAJECTORY RECORDING

CROSS REFERENCE TO RELATED APPLICATION/INCORPORATION BY REFERENCE

This U.S. Patent Application claims priority to and the benefit of U.S. Provisional Patent Application Ser. No. 63/280,289 filed on Nov. 17, 2021, which is incorporated by reference herein in its entirety. U.S. Published Patent Application No. 2020/0139474 A1 is incorporated by reference herein it its entirety. U.S. Pat. No. 9,833,857 B2 is incorporated by reference herein in its entirety.

FIELD

Embodiments of the present invention relate to the use of robots (e.g., collaborative robots or cobots, or more traditional industrial robots) for welding or cutting. More specifically, embodiments of the present invention relate to systems and methods for recording robot path traversals and creating associated motion programs in a more efficient manner.

BACKGROUND

Programming motion trajectories of a robot (e.g., a collaborative robot or an industrial robot) prior to actual welding or cutting can be quite complicated. In addition to the challenges associated with programming a weld trajectory along a weld joint, other challenges associated with programming an ingress trajectory toward a weld joint and an egress trajectory away from a weld joint exist. Furthermore, avoiding collisions of the robot with other objects within the welding or cutting environment provide even more challenges.

SUMMARY

In one embodiment, the motion of the tool center point (TCP) of a robot is automatically recorded as an operator moves the arm of the robot within the workspace. A welding gun/torch is attached to the end of the robot arm (with respect to the TCP) and the robot is calibrated to know where the TCP is located in three-dimensional space with respect to at least one coordinate system (e.g., the coordinate system of the robot and/or of the workspace). The operator pushes an actuator (e.g., a button or a switch) and proceeds to move the robot arm in space (e.g., ingress towards a weld joint to be welded, across the weld joint, and/or egress away from the weld joint). Pushing of the actuator starts the robot to record the position of the TCP (and effectively the tip of the welding gun/torch) in 3D space as the operator moves the robot arm. The operator does not have to subsequently push a button or do anything else to cause multiple position points to be recorded along the trajectory that the robot arm takes. Multiple position points defining the trajectory are recorded automatically as the operator moves the robot arm, and a motion program for the robot is automatically created. The number of recorded points is based on a distance traveled, in accordance with one embodiment. When the operator has completed moving the robot arm along the desired trajectory, the operator can push the same actuator again (or a different actuator) to stop the recording.

In one embodiment, a system may include a "smart" welding torch that attaches to the arm of a robot and which can be moved along a desired welding path to program the desired welding path into a controller of the robot via actuators on the "smart" welding torch. In an alternative embodiment, the torch can be a "smart" cutting torch for performing cutting operations instead of welding operations.

In one embodiment, a welding system for generating a motion program is provided. The welding system includes a robot (e.g., a collaborative robot) having an arm and a calibrated tool center point (TCP). The welding system also includes a welding tool connected to a distal end of the arm of the robot in a determined relation to the TCP. The welding system further includes a programmable robot controller and a servo-mechanism apparatus configured to move the arm of the robot under the command of the programmable robot controller via a motion program. The welding system also includes an actuator operatively connected to the programmable robot controller. The welding system is configured to allow an operator to activate the actuator and proceed to manually move the arm of the robot in a 3D space from a start point to a destination point, defining an operator path. For example, the operator path may be an ingress path toward a work piece, or an egress path away from a work piece. Activation of the actuator commands the programmable robot controller to record a plurality of spatial points of the TCP in the 3D space as the operator manually moves the arm of the robot along the operator path. The operator does not have to subsequently activate any actuator to cause the plurality of spatial points to be recorded along the operator path that the arm of the robot takes when manually moved by the operator. The programmable robot controller is configured to identify and eliminate extraneous spatial points from the plurality of spatial points as recorded, leaving a subset of the plurality of spatial points as recorded, where the extraneous spatial points are a result of extraneous movements of the arm of the robot by the operator. In one embodiment, the extraneous spatial points are identified by the robot controller at least in part by the controller analyzing the plurality of spatial points as recorded to determine which spatial points of the plurality of spatial points as recorded are not needed to accomplish moving from the start point to the destination point within the 3D space. In one embodiment, the programmable robot controller is configured to perform a spatial smoothing operation on the subset of the plurality of spatial points as recorded, resulting in a smoothed trajectory of spatial points, and the programmable robot controller is configured to automatically generate the motion program for the robot corresponding to the smoothed trajectory of spatial points. In one embodiment, the programmable robot controller is configured to perform a spatial interpolation operation on the subset of the plurality of spatial points as recorded, resulting in an interpolated trajectory of spatial points. The programmable robot controller is configured to perform a spatial smoothing operation on the interpolated trajectory of spatial points as recorded, resulting in a smoothed trajectory of spatial points, and the programmable robot controller is configured to automatically generate the motion program for the robot corresponding to the smoothed trajectory of spatial points.

In one embodiment, a robotic welding system for generating a motion program is provided. The robotic welding system includes a programmable robot controller of a robot (e.g., a collaborative robot) having a computer processor and a computer memory. The programmable robot controller is configured to digitally record, in the computer memory, a plurality of spatial points along an operator path in a 3D space taken by a calibrated tool center point (TCP) of the robot as an operator manually moves a robot arm of the robot along the operator path from a start point to a destination point within the 3D space. For example, the operator path may be an ingress path toward a work piece, or an egress path away from a work piece. The programmable robot controller is also configured to identify and eliminate, from the computer memory, extraneous spatial points from the plurality of spatial points as digitally recorded, leaving a subset of the plurality of spatial points as digitally recorded, where the extraneous spatial points are a result of extraneous movements of the robot arm by the operator. In one embodiment, the extraneous spatial points are identified by the programmable robot controller at least in part by the programmable robot controller analyzing the plurality of spatial points as digitally recorded to determine which spatial points of the plurality of spatial points as digitally recorded are not needed to accomplish moving from the start point to the destination point within the 3D space. In one embodiment, the programmable robot controller is configured to perform a spatial smoothing operation on the subset of the plurality of spatial points as recorded, resulting in a smoothed trajectory of spatial points, and the programmable robot controller is configured to automatically generate a motion program for the robot corresponding to the smoothed trajectory of spatial points. In one embodiment, the programmable robot controller is configured to perform a spatial interpolation operation on the subset of the plurality of spatial points as recorded, resulting in an interpolated trajectory of spatial points. The programmable robot controller is configured to perform a spatial smoothing operation on the interpolated trajectory of spatial points as recorded, resulting in a smoothed trajectory of spatial points, and automatically generate a motion program for the robot corresponding to the smoothed trajectory of spatial points.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
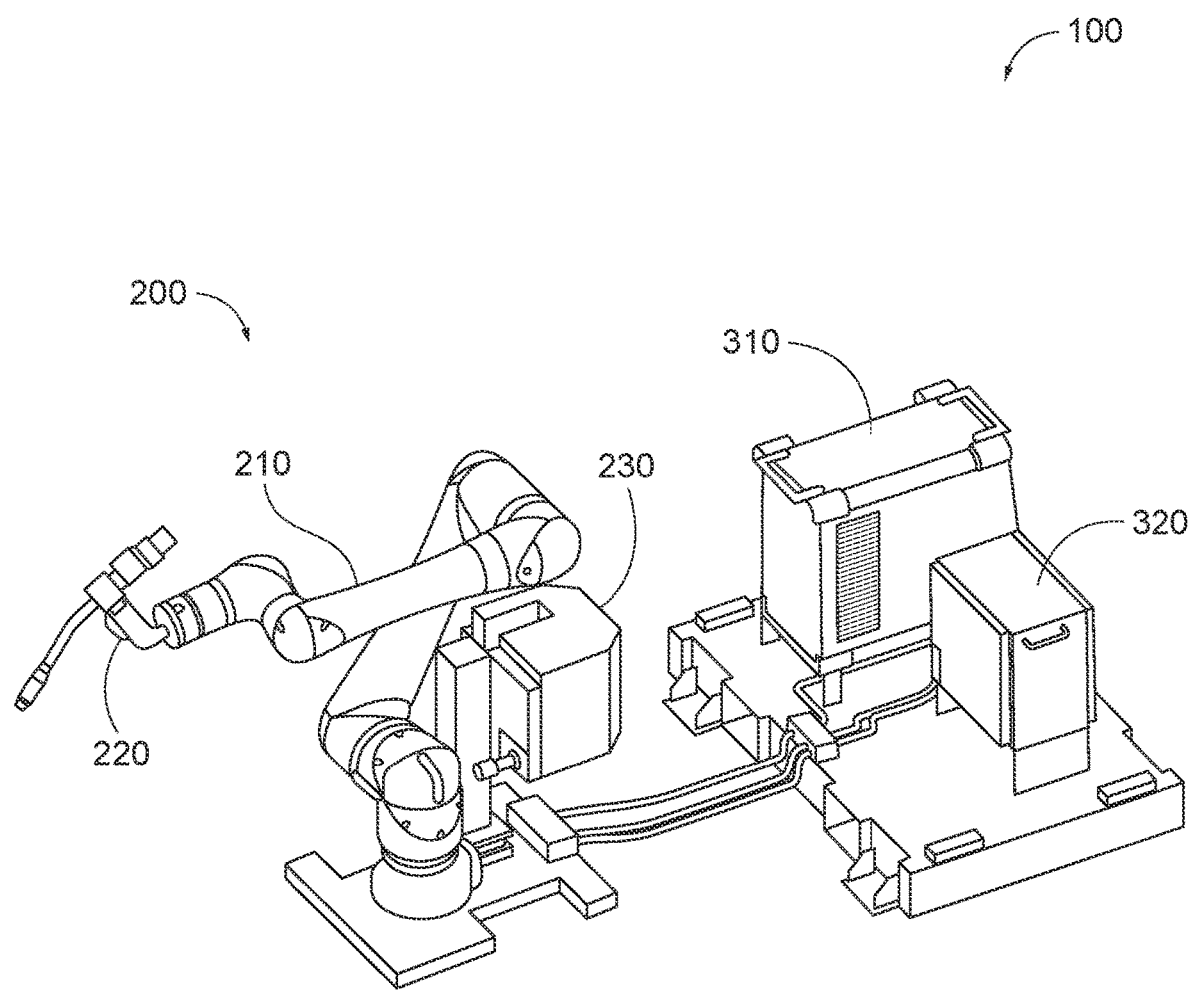
FIG. 1 illustrates one embodiment of a welding system having a collaborative robot.
Figure 2:
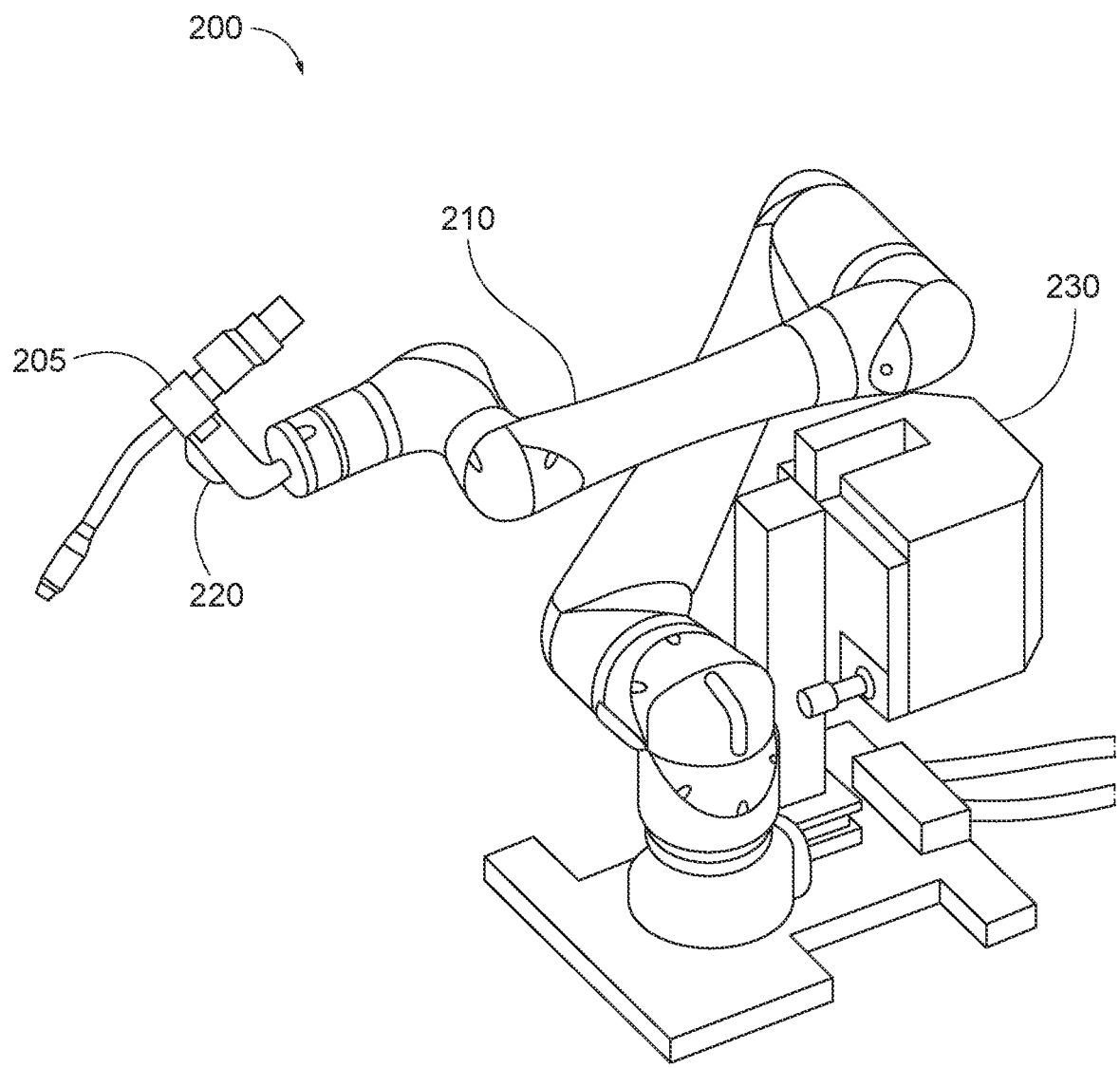
FIG. 2 illustrates one embodiment of the collaborative robot of FIG. 1.

The examples and figures herein are illustrative only and are not meant to limit the subj ect invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a welding system 100 having a collaborative robot 200. FIG. 2 illustrates one embodiment of the collaborative robot 200 of FIG. 1.

Referring to FIG. 1 and FIG. 2, the welding system 100 includes a collaborative robot 200, a welding power supply 310, and a programmable robot controller 320. The collaborative robot 200 has an arm 210 configured to hold a welding torch (e.g., a welding gun) 220. The terms "torch" and "gun" are used herein interchangeably. The collaborative robot 200 also includes a servo-mechanism apparatus 230 configured to move the arm 210 of the collaborative robot 200 under the command of the robot controller 320 (via a motion program). In one embodiment, the welding system 100 includes a wire feeder (not shown) to feed welding wire to the welding torch 220.

In one embodiment, the motion of the calibrated tool center point (TCP 205) of a cobot (and effectively the tip of the welding gun/torch 220) is recorded as an operator moves the arm of the cobot within the workspace. A welding gun/torch 220 is attached to the end of the cobot arm 210 (with respect to the TCP) and the cobot is calibrated to know where the TCP is located in three-dimensional space with respect to a coordinate system (e.g., the coordinate system of the cobot). The operator pushes an actuator (e.g., a button or a switch) and proceeds to move the cobot arm in space (e.g., ingress towards a weld joint to be welded, across the weld joint, or egress away from the weld joint). The trajectories associated with ingress and egress are known herein as "air move" trajectories, since they are trajectories in the air and not at the weld joint. Pushing of the actuator starts the cobot to record the position of the TCP (and effectively the tip of the welding gun/torch) in 3D space (e.g., as coordinate points) as the operator moves the cobot arm. Another actuator 224 (e.g., see FIG. 4 herein) may be provided to allow the arm to be unlocked so it can be moved by the operator (e.g., in the form of a "kill" switch).

In one embodiment, the welding torch 220 is a "smart" welding torch. The term "smart" is used herein to refer to certain programmable capabilities provided by the welding torch/gun 220 which are supported by the robot controller 320. In one embodiment, the welding torch 220 includes a torch body 226 (e.g., see FIG. 3 herein) configured to be operatively connected to the arm 210 of the collaborative robot 200. One actuator device 224 (e.g., see FIG. 4) on the torch body 226 is configured to be activated by a human user to enable the arm 210 of the collaborative robot, with the welding torch 220 connected, to be moved by the human user (operator) along a desired path (e.g., along an ingress path to a weld joint, along an egress path away from a weld joint, or along a weld joint itself along which the collaborative robot 200 is to make a weld). Another actuator device 222 (see FIG. 3 and FIG. 4) on the torch body is configured to be activated by the human user to initiate a recording cycle at a start point and to terminate the recording cycle at a destination or end point in three-dimensional (3D) space.

The actuator devices 222 and 224 are configured to communicate with the robot controller 320 to record the weld points along the desired path. For example, a weld may be made along a desired welding path by the collaborative robot 200 using the welding torch 220 from the start point to the destination point.

The operator does not have to repetitively push a button (actuator) or do anything else to cause multiple position points to be recorded (e.g., by the cobot controller 320) along the trajectory that the cobot arm takes. Multiple position points (e.g., spatial coordinate points) defining the trajectory are recorded automatically as the operator moves the cobot arm, and a motion program for the cobot is automatically created (e.g., by the cobot controller 320). The number of recorded points is based on a distance traveled, in accordance with one embodiment. When the operator has completed moving the cobot arm along the desired trajectory, the operator can push the same actuator 222 again (or another actuator) to stop the recording. Therefore, for any single weld, no more than two button clicks are required. The actuator to start/stop recording may be located on the cobot arm, the cobot body, or the welding torch/gun, in accordance with various embodiments. Other locations within the system are possible as well.

In one embodiment, post-processing (e.g., spatial and/or temporal filtering) of the recorded position points (spatial points) is performed by the cobot welding system (e.g., by the cobot controller 320) and the motion program is updated accordingly. The post-processing results in smoothing the subsequent automatic movement of the cobot along the recorded trajectory as commanded by the motion program. For example, any unwanted jerky, non-uniform motion (e.g., in position and/or orientation) introduced by the operator when moving the cobot arm is vastly reduced, if not totally eliminated. More uniform time spacing between the recorded points is also provided. Furthermore, in accordance with one embodiment, programming of fine motion of the cobot arm is automated during post processing (e.g., for weaving along the weld joint, or when the welding torch/gun is rounding a corner of a weld).

Figure 3:
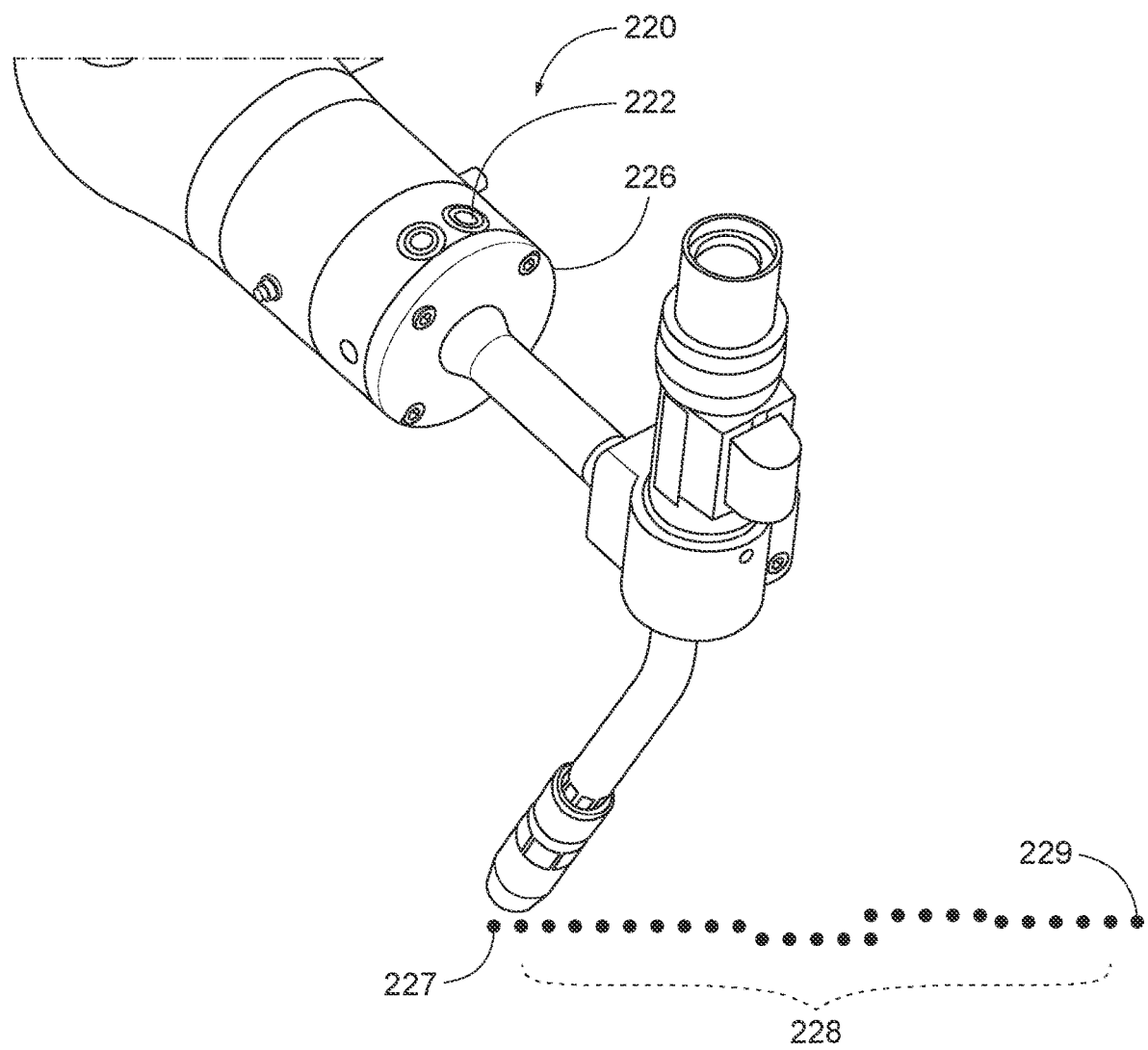
FIG. 3 illustrates one embodiment of a welding torch/gun attached to a distal end of an arm of the collaborative robot of FIG. 1 and FIG. 2.

FIG. 3 illustrates one embodiment of a "smart" welding torch 220 configured to be used by the collaborative robot 200. The "smart" welding torch 220 is configured to be operatively connected to (attached to) the arm 210 of the collaborative robot 200. The "smart" welding torch 220 includes a first actuator device 222 (e.g., a momentary push-button device). The first actuator device 222 is on the torch body 226 and is configured to be activated by a human user (operator) to initiate a recording cycle along a path, for example, at a start point 227 and to terminate the recording cycle, for example, at a destination point 229 in three-dimensional (3D) space.

In accordance with one embodiment, the first time the first actuator device 222 is pressed by the user, the recording cycle is started. The second time the first actuator device 222 is pressed by the user, the recording cycle is ended. The actuator device may be a momentary push-button device, a switch, or another type of actuator device, in accordance with various embodiments. Position points 227, 228, and 229 in three-dimensional space along the path are automatically recorded by the robot controller 320 as the operator moves the welding torch 220 (as attached to the cobot arm 210) along the path trajectory (before actual welding occurs). Again, an actuator does not have to be pushed or switched in order to indicate each position point to be recorded. Multiple position points (spatial points) defining the trajectory are recorded automatically as the operator moves the cobot arm, and a motion program for the cobot is automatically created. The number of recorded points is based on a distance traveled, in accordance with one embodiment.

Figure 4:
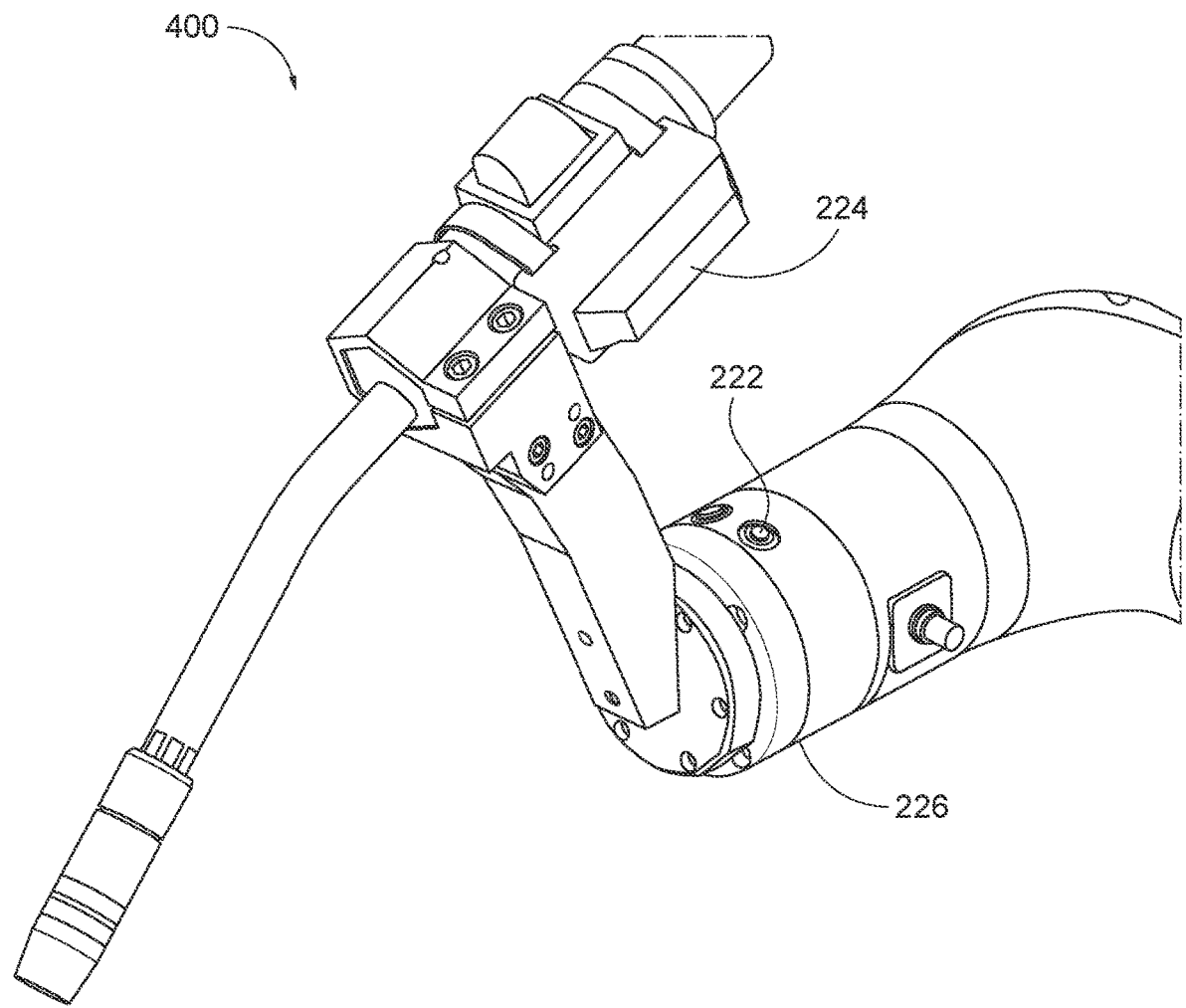
FIG. 4 illustrates another embodiment of a welding torch/gun attached to a distal end of an arm of the collaborative robot of FIG. 1 and FIG. 2.

FIG. 4 illustrates another embodiment of a welding torch/gun 400 attached to a distal end of an arm 210 of the collaborative robot 200 of FIG. 1 and FIG. 2. Referring to FIG. 4, in one embodiment, the "smart" welding torch 400 also includes a second actuator device 224 (e.g., configured as a dead man's switch). The second actuator device 224 on the torch body 226 is configured to be activated by a human user to enable the arm 210 of the collaborative robot 200, with the "smart" welding torch 400 connected, to be moved by the human user along a desired path (e.g., an ingress path, an egress path, or a weld path). The "smart" welding torch 400 allows the user to safely move the arm 210 of the robot 200 and create path programs (motion programs). When the user releases the second actuator device 224, the robot arm 210 cannot move (the arm is locked).

The first and second actuator devices 222 and 224 communicate, either directly or indirectly, with the robot controller 320 to accomplish the functionality described herein, in accordance with one embodiment. The user holds down the second actuator device 224 to move the arm 210 while establishing start/end locations (to initiate a recording cycle and to terminate the recording cycle using the first actuator device 222) and automatically recording operator path position points (spatial coordinate points) without having to manipulate an actuator device at each recorded point. In this manner, a user does not need to hold a teach pendant tablet, resulting in a more ergonomically friendly process for the user. In accordance with other embodiments, the actuator device 222 may be located elsewhere on the system (e.g., on the cobot arm or on the servo-mechanism apparatus 230).

Figure 5:
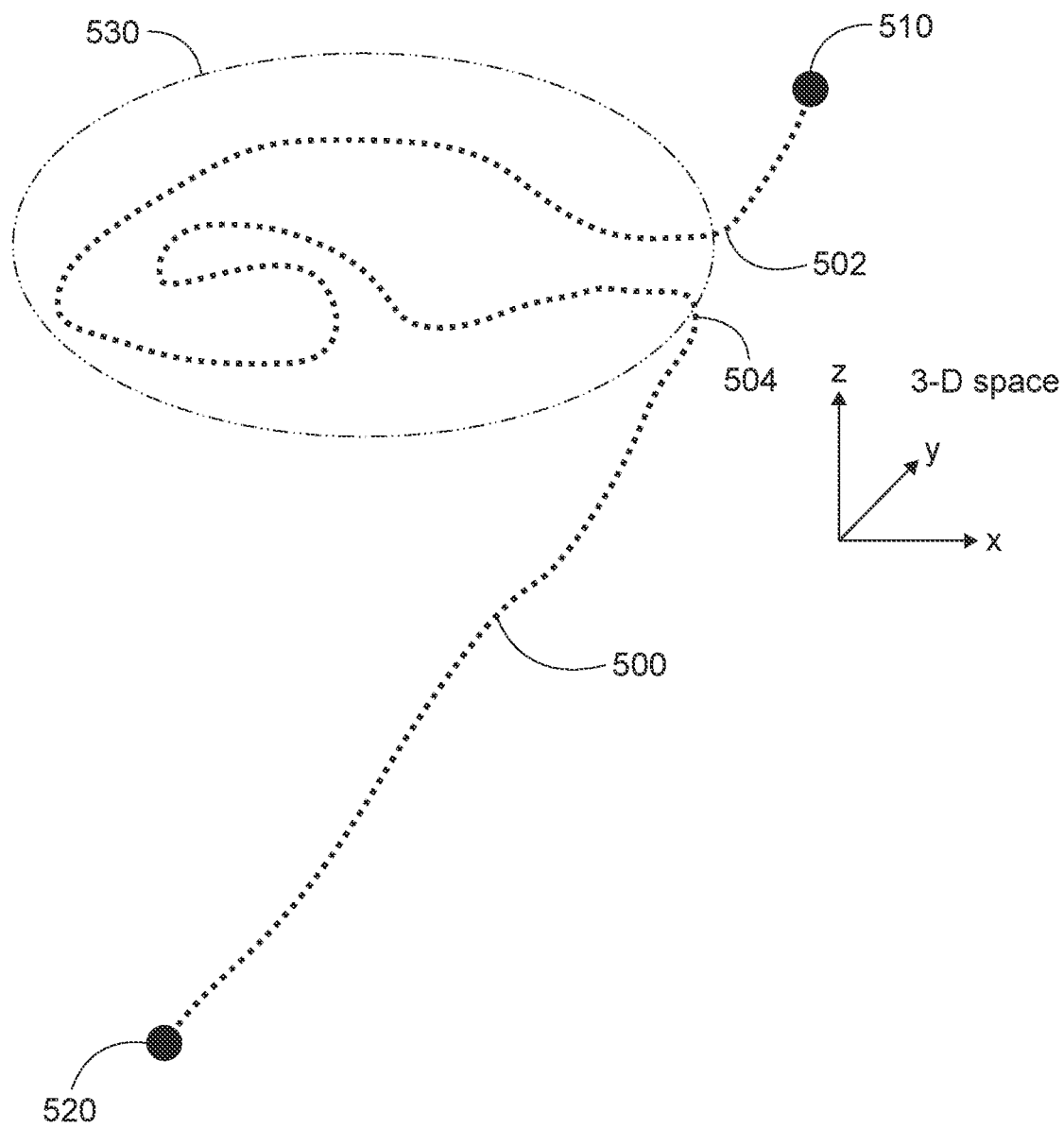
FIG. 5 illustrates an example of digitally recorded spatial position points of an operator path formed by an operator moving an arm of the collaborative robot of FIG. 2.

FIG. 5 illustrates an example of digitally recorded spatial points 500 (dotted line) of an operator path formed by an operator moving an arm 210 of the collaborative robot 200 of FIG. 2 in a 3D space of a defined coordinate system of the robot 200. The operator path of FIG. 5 has a start point 510 (where recording is started) and a destination point 520 where recording is ended. For example, in one embodiment, the operator path may be an ingress path from the start point 510 to the beginning of a weld joint position at the destination point 520. However as shown in FIG. 5, during the process of moving the robot arm 210 from the start point 510 to the destination point 520, the operator (for whatever reason) moved the robot arm 210 in an extraneous manner, instead of taking a more direct path. The portion of the recorded spatial points 500 within the depicted dotted-and-dashed oval 530 of FIG. 5 are extraneous spatial points. The extraneous spatial points are a result of extraneous movements of the arm 210 of the robot 200 by the operator and are not needed to accomplish moving from the start point 510 to the destination point 520 within the 3D space. For example, maybe the operator decided to re-orient an angular orientation of the torch 220, which resulted in the extraneous spatial points being recorded.

The programmable robot controller 320 is programmed to identify and eliminate the extraneous spatial points from the recorded spatial points 500, leaving a subset of the recorded spatial points 500. In one embodiment, the extraneous spatial points are identified by the robot controller 320 at least in part by the controller 320 analyzing the recorded spatial points 500 to determine which spatial points of the recorded spatial points as recorded are not needed to accomplish moving from the start point to the destination point within the 3D space. Referring to FIG. 5, the robot controller 320 would identify and eliminate the recorded spatial points within the dotted-and-dashed oval 530. The term "identify and eliminate" as used herein generally refers to differentiating the extraneous spatial points from the rest of the spatial points as originally recorded.

In accordance with one embodiment, initially identifying the extraneous spatial points may involve computing work space distance relationships and/or work space vector relationships for each recorded spatial point with respect to the start point and the destination point, and/or with respect to those recorded spatial points immediately surrounding or next to each recorded spatial point. Those recorded spatial points having distance relationships and/or vector relationships that are outside of some defined range(s) may be identified as extraneous spatial points. Other techniques of identifying the extraneous spatial points are possible as well, in accordance with other embodiments. Eliminating the extraneous spatial points, as identified, may involve deleting the extraneous spatial points from a computer memory, digitally flagging the extraneous spatial points as being extraneous, or some other technique, in accordance with various embodiments.

Once the extraneous spatial points are eliminated, the controller 320 can proceed to perform a spatial interpolation operation and/or a spatial smoothing operation on the remaining subset of the recorded spatial points. For example, additional spatial points may be generated via interpolation between certain recorded spatial points to fill in any gaps (e.g., between the recorded spatial points 502 and 504 in FIG. 5). More uniform time spacing between the recorded points can also be provided via temporal interpolation, for example. Then, the overall trajectory formed by the spatial points (as interpolated, if performed) can be smoothed, via a spatial smoothing operation, to eliminate any unwanted jerky or non-uniform motion from the trajectory. Furthermore, in accordance with one embodiment, programming of fine motion of the robot arm is automated during post processing (e.g., for weaving along the weld joint, or when the welding torch/gun is rounding a corner of a weld). Once the remaining recorded spatial points are interpolated and/or smoothed, the robot controller 320 automatically generates a motion program for the robot. During an actual welding or cutting operation, the motion program will command the robot to move such that resultant trajectory formed by the interpolated and/or smoothed spatial points is followed by the robot.

Figure 6:
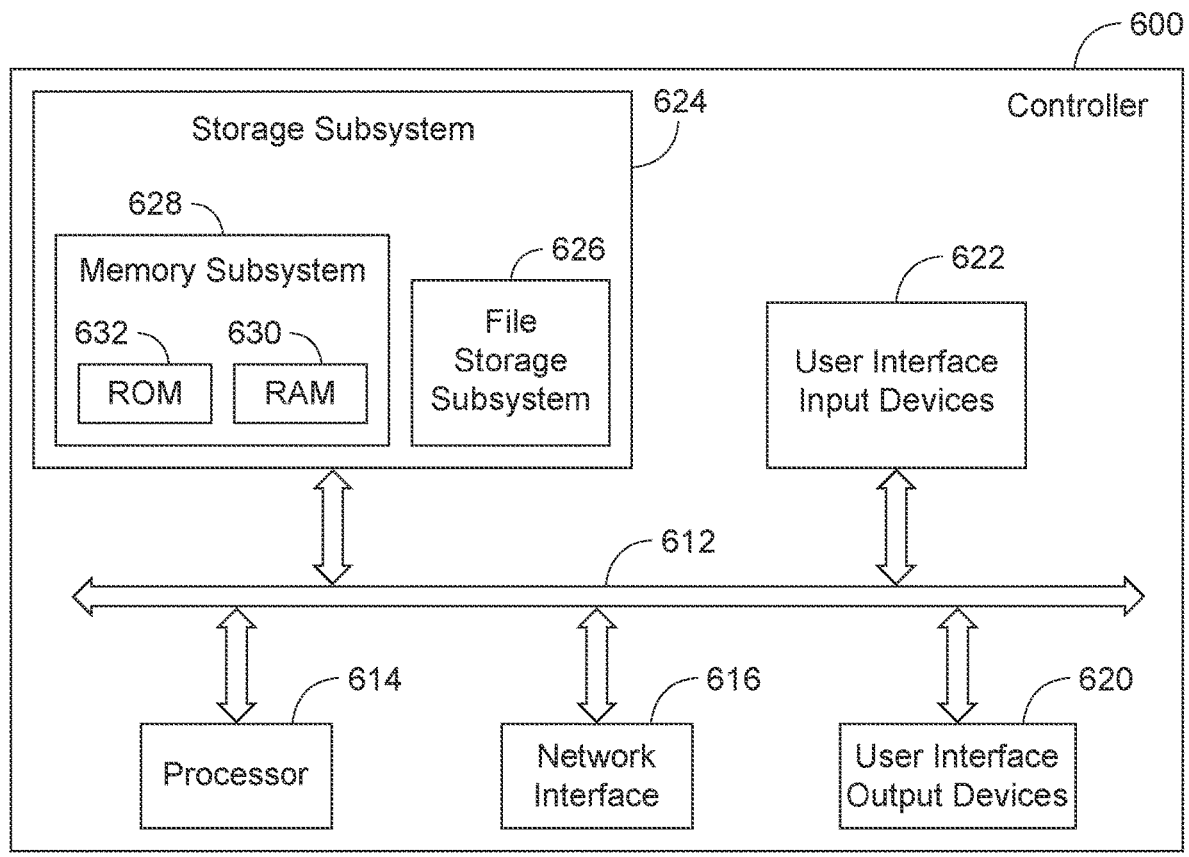
FIG. 6 illustrates a block diagram of an example embodiment of a controller that can be used, for example, in the welding system of FIG. 1.

FIG. 6 illustrates a block diagram of an example embodiment of a controller 600 that can be used, for example, in the welding system 100 of FIG. 1. For example, the controller 600 may be used as the robot controller 320 and/or as a controller in the welding power supply 310. Referring to FIG. 6, the controller 600 includes at least one processor 614 (e.g., a microprocessor, a central processing unit, a graphics processing unit) which communicates with a number of peripheral devices via bus subsystem 612. These peripheral devices may include a storage subsystem 624, including, for example, a memory subsystem 628 and a file storage subsystem 626, user interface input devices 622, user interface output devices 620, and a network interface subsystem 616. The input and output devices allow user interaction with the controller 600. Network interface subsystem 616 provides an interface to outside networks and is coupled to corresponding interface devices in other devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 600 or onto a communication network.

User interface output devices 620 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 600 to the user or to another machine or computer system.

Storage subsystem 624 stores programming and data constructs that provide some or all of the functionality described herein. For example, computer-executable instructions and data are generally executed by processor 614 alone or in combination with other processors. Memory 628 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 626 in the storage subsystem 624, or in other machines accessible by the processor(s) 614.

Bus subsystem 612 provides a mechanism for letting the various components and subsystems of the controller 600 communicate with each other as intended. Although bus subsystem 612 is shown schematically as a single bus, alternative embodiments of the bus subsystem may use multiple buses.

The controller 600 can be of varying types. Due to the ever-changing nature of computing devices and networks, the description of the controller 600 depicted in FIG. 6 is intended only as a specific example for purposes of illustrating some embodiments. Many other configurations of a controller are possible, having more or fewer components than the controller 600 depicted in FIG. 6.

In one embodiment, the start point and the destination point of a weld is recorded. A data base is accessed to indicate how to set the various angles, stick out, etc., based on visually (e.g., optically) observing the weld joint to determine what type of weld is to be created. For example, a camera or a light detection and ranging (Lidar) capability may be employed. Alternatively, a weld wire sensing technique may be used to determine the type of weld (e.g., see U.S. Published Patent Application No. 2020/0139474 A1 which is incorporated herein by reference it its entirety).

In one embodiment, the automatic recording and filtering of "air move" trajectories between welds is performed. In this manner the operator (user) can focus mainly on the creation of welds (starts, in-between points, and ends), not so much on the creation of points in the air as the cobot TCP moves to (ingress) and away from (egress) a weld.

In one embodiment, air motion of the cobot is recorded as a means to map free space around the cobot. All "air move" trajectories are recorded to help build a map of the entire cobot workspace. For a given part to be welded, this information can be used to generate collision free trajectories from one weld to another using established path planning algorithms.

In one embodiment, the cobot is deliberately allowed to collide with objects in the workspace of the cobot to learn and find a collision free trajectory. It has been observed that cobot collisions are harmless, unlike traditional industrial robots. Recording of air motion while an operator moves the arm of the cobot within the workspace is not performed. Instead, the welds are created and the cobot attempts to move its arm between the welds (from one weld to another) without regard for collisions. If the cobot collides on its way to the next weld, the cobot can modify its programmed trajectory in an attempt to find a collision free trajectory. Information from any collision itself (e.g., colliding forces) can be used.

In one embodiment, a "weld database" containing information about plate angles, torch angles, work angles, stick out, etc. is provided to achieve a particular robotic weld. In one embodiment, a search strategy is automatically generated (tactile or with a more advanced sensor such as a small camera or a Lidar capability) to accurately locate the weld joint in space during production, where the part tolerances may vary from part to part. In one embodiment, the weld joint is automatically located during the programming process for a new part to be programmed by locating the weld wire (or other sensor) "close enough" to the weld joint and using a predetermined search strategy to locate the wire more precisely within the weld joint.

One embodiment provides advanced 3D sensing/scanning for weld feature recognition. In one embodiment, the volumes and high mix production present in the cobot space are exploited as training data to train the cobot to recognize weld joints. Training data can be gathered from many cobots within a manufacturing space. There is access to two pieces of information from which to train a machine learning (ML) model: 1) 3D sensor information, 2) Information about how the user taught a particular weld joint (i.e., torch angles, weld type, etc.). Such a model can be used to predict torch angles, weld types, etc., given information from a 3D sensor. The system can offer suggestions benefiting the end-user while also gathering the information necessary to build such an ML model.

Embodiments of the present invention are not limited to cobots. Other embodiments employing industrial robots are possible as well. For example, a user may use a teach pendant to get a robot close in to a joint, and then let the robot automatically perform a fine tuning of position and orientation at the joint. For example, a touch-sensing technique may be performed as discussed in U.S. Pat. No. 9,833,857 B2 which is incorporated by reference herein in its entirety.

In one embodiment, a database is queried upon weld creation to get basic parameters for the type of weld joint. A user gets the welding wire close within the weld joint at a position (cobot via user arm, or robot using teach pendant), then lets the cobot/robot do a search routine to achieve a more fine-tuned positioning within the weld joint (robot knows joint type and other parameters, from database, and performs a corresponding search strategy). This is done for each position across the weld joint.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A welding system for generating a motion program, the welding system comprising:
   a robot having an arm and a calibrated tool center point (TCP);
   a welding tool connected to a distal end of the arm of the robot in a determined relation to the TCP;
   a programmable robot controller;
   a servo-mechanism apparatus configured to move the arm of the robot under the command of the programmable robot controller via a motion program; and
   an actuator operatively connected to the programmable robot controller,
   wherein the welding system is configured to allow an operator to activate the actuator and proceed to manually move the arm of the robot in a 3D space from a start point to a destination point, defining an operator path,
   wherein activation of the actuator commands the programmable robot controller to record a plurality of spatial points of the TCP in the 3D space as the operator manually moves the arm of the robot along the operator path, where the operator does not have to subsequently activate any actuator to cause the plurality of spatial points to be recorded along the operator path that the arm of the robot takes when manually moved by the operator, and
   wherein the programmable robot controller is configured to identify and eliminate extraneous spatial points from the plurality of spatial points as recorded, leaving a subset of the plurality of spatial points as recorded, where the extraneous spatial points are a result of extraneous movements of the arm of the robot by the operator.

2. The welding system of claim 1, wherein the extraneous spatial points are identified by the robot controller at least in part by the controller analyzing the plurality of spatial points as recorded to determine which spatial points of the plurality of spatial points as recorded are not needed to accomplish moving from the start point to the destination point within the 3D space.

3. The welding system of claim 1, wherein the programmable robot controller is configured to perform a spatial smoothing operation on the subset of the plurality of spatial points as recorded, resulting in a smoothed trajectory of spatial points.

4. The welding system of claim 3, wherein the programmable robot controller is configured to automatically generate the motion program for the robot corresponding to the smoothed trajectory of spatial points.

5. The welding system of claim 1, wherein the programmable robot controller is configured to perform a spatial interpolation operation on the subset of the plurality of spatial points as recorded, resulting in an interpolated trajectory of spatial points.

6. The welding system of claim 5, wherein the programmable robot controller is configured to perform a spatial smoothing operation on the interpolated trajectory of spatial points as recorded, resulting in a smoothed trajectory of spatial points.

7. The welding system of claim 6, wherein the programmable robot controller is configured to automatically generate the motion program for the robot corresponding to the smoothed trajectory of spatial points.

8. The welding system of claim 1 wherein the robot is a collaborative robot.

9. The welding system of claim 1, wherein the operator path is an ingress path to a work piece.

10. The welding system of claim 1, wherein the operator path is an egress path from a work piece.

11. A robotic welding system for generating a motion program, the robotic welding system comprising:
a programmable robot controller of a robot having a computer processor and computer memory, the programmable robot controller configured to:
digitally record in the computer memory a plurality of spatial points along an operator path in a 3D space taken by a calibrated tool center point (TCP) of the robot as an operator manually moves a robot arm of the robot along the operator path from a start point to a destination point within the 3D space; and
identify and eliminate from the computer memory extraneous spatial points from the plurality of spatial points as digitally recorded, leaving a subset of the plurality of spatial points as digitally recorded, where the extraneous spatial points are a result of extraneous movements of the robot arm by the operator.

12. The robotic welding system of claim 11, wherein the extraneous spatial points are identified by the programmable robot controller at least in part by the programmable robot controller analyzing the plurality of spatial points as digitally recorded to determine which spatial points of the plurality of spatial points as digitally recorded are not needed to accomplish moving from the start point to the destination point within the 3D space.

13. The robotic welding system of claim 11, wherein the programmable robot controller is configured to perform a spatial smoothing operation on the subset of the plurality of spatial points as recorded, resulting in a smoothed trajectory of spatial points.

14. The robotic welding system of claim 13, wherein the programmable robot controller is configured to automatically generate a motion program for the robot corresponding to the smoothed trajectory of spatial points.

15. The robotic welding system of claim 11, wherein the programmable robot controller is configured to perform a spatial interpolation operation on the subset of the plurality of spatial points as recorded, resulting in an interpolated trajectory of spatial points.

16. The robotic welding system of claim 15, wherein the programmable robot controller is configured to perform a spatial smoothing operation on the interpolated trajectory of spatial points as recorded, resulting in a smoothed trajectory of spatial points.

17. The robotic welding system of claim 16, wherein the programmable robot controller is configured to automatically generate a motion program for the robot corresponding to the smoothed trajectory of spatial points.

18. The robotic welding system of claim 11 wherein the programmable robot controller is part of a collaborative robot.

19. The robotic welding system of claim 11, wherein the operator path is an ingress path to a work piece.

20. The robotic welding system of claim 11, wherein the operator path is an egress path from a work piece.

* * * * *